D. HULL.
Ore Washer.
No. 54,355.
Patented May 1, 1866.
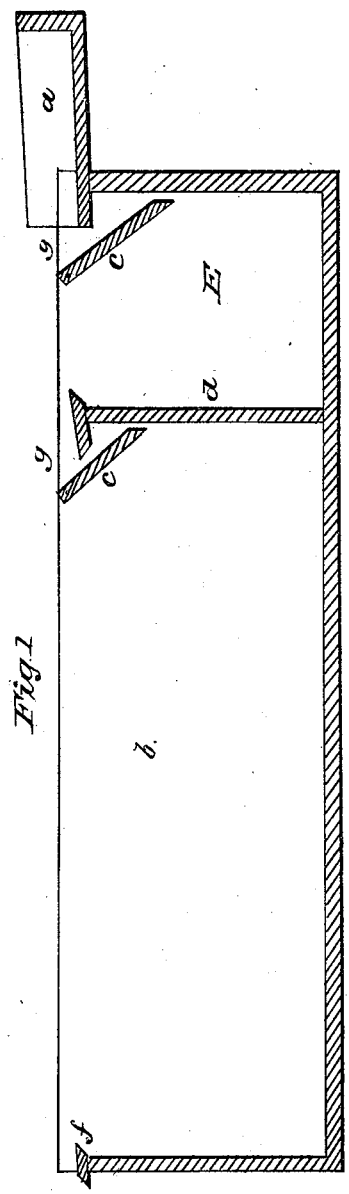
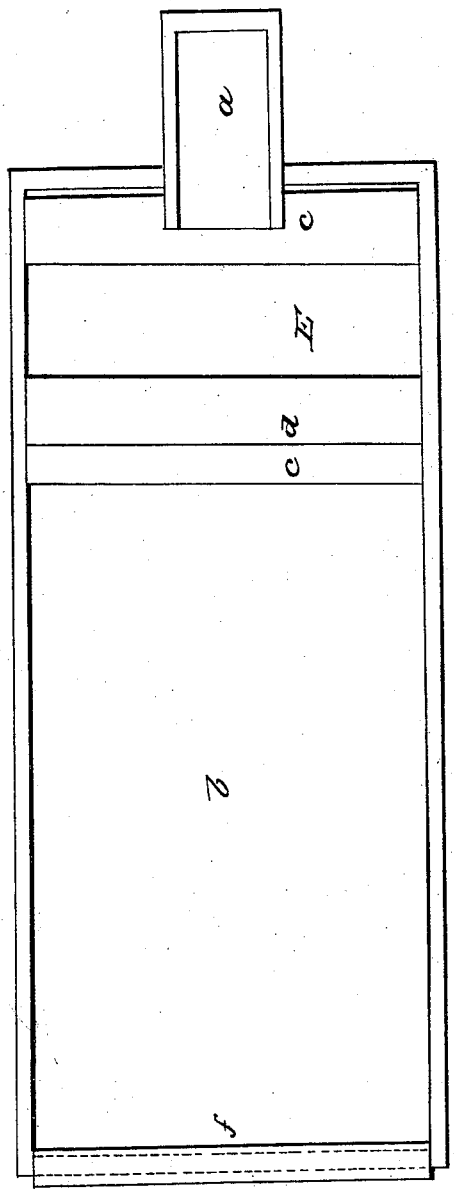

UNITED STATES PATENT OFFICE.

DUANE HULL, OF NEWBURG, NEW YORK.

IMPROVED APPARATUS FOR WASHING KAOLIN, &c.

Specification forming part of Letters Patent No. 54,355, dated May 1, 1866.

*To all whom it may concern:*

Be it known that I, DUANE HULL, of Newburg, in the county of Orange and State of New York, have invented a new and useful Improvement in the Mode of Washing Kaolin, Ochre, or other Earthy Minerals; and I do hereby declare that the following is a full and exact description thereof, reference being had to the accompanying drawings, and to the letters of reference marked thereon.

The nature of my invention consists in providing a suitable tank, with one or more partitions in it, with a box or trough leading into the same. I then put the kaolin, ochre, or other minerals into the said box or trough and let a stream of water into the same for the purpose of washing or dressing the said kaolin, ochre, or minerals.

To enable others skilled in the art to make and use my invention, I will proceed to describe its construction and operation more minutely.

I construct a common tank, as seen in the accompanying drawings, which constitutes a part of these specifications.

Figure 1 is a sectional view, and Fig. 2 is a plan or birds-eye view, with partition $d$, trough $a$, breaks $c\ c\ c$, for the purpose set forth. When the tank is ready for use, the breaks $c\ c\ c$ are hung at the top or upper side, with a hinge, as seen at $g\ g$, Fig. 1, and the bottom or lower side of the breaks $c\ c\ c$ are fastened by a hook, $h\ h$, or any other common device which will answer the purpose, so that the bottom or lower side of the breaks $c\ c\ c$ may be brought nearer the partitions or side of the tank, for the purpose of increasing or retarding the current.

When kaolin, ochre, or other minerals are put into the box or trough $a$, Fig. 1, a stream of water is let into the same upon the ochre, &c., which is rapidly washed out of the said trough $a$, Fig. 1, into the first compartment of the tank E. The current of water is broken or turned by the break $c\ c$, Fig. 1, and the sand or grit is deposited at the bottom of the first compartment instead of being washed over the partition $d$, Fig. 1, into the second compartment, which is intended to receive the fine or washed kaolin, ochre, or other minerals; and now to prevent the fine particles of the said kaolin, ochre, and other minerals from being carried out of the tank, at $f$, Fig. 1, I place another break $c$, which stops, breaks, or turns the current, and enables the kaolin, ochre, or other minerals to settle therein and the water to pass out of the tank clear at $f$, Fig. 1.

What I claim as my invention, and desire to secure by Letters Patent, are—

The breaks $c\ c\ c$, Fig. 1, and the said breaks $c\ c\ c$, working on a hinge or joint, for the purposes set forth.

DUANE HULL.

Witnesses:
FRANK S. HULL,
B. S. HEDRICK.